United States Patent
Oono

(10) Patent No.: US 11,245,110 B2
(45) Date of Patent: Feb. 8, 2022

(54) POSITIVE ELECTRODE MATERIAL FOR LITHIUM ION POLYMER BATTERY, POSITIVE ELECTRODE FOR LITHIUM ION POLYMER BATTERY, AND LITHIUM ION POLYMER BATTERY

(71) Applicant: SUMITOMO OSAKA CEMENT CO., LTD., Tokyo (JP)

(72) Inventor: Kouji Oono, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 160 days.

(21) Appl. No.: 16/799,645

(22) Filed: Feb. 24, 2020

(65) Prior Publication Data

US 2021/0098779 A1    Apr. 1, 2021

(30) Foreign Application Priority Data

Sep. 26, 2019    (JP) .............................. JP2019-175384

(51) Int. Cl.
*H01M 4/36*    (2006.01)
*H01M 4/58*    (2010.01)
(Continued)

(52) U.S. Cl.
CPC ........... *H01M 4/366* (2013.01); *H01M 4/587* (2013.01); *H01M 4/5825* (2013.01);
(Continued)

(58) Field of Classification Search
None
See application file for complete search history.

(56) References Cited

U.S. PATENT DOCUMENTS

2015/0364749 A1*    12/2015    Kim ..................... H01M 4/1391
                                                        252/506
2019/0305304 A1     10/2019    Oshitari et al.

FOREIGN PATENT DOCUMENTS

EP        3301740 A        4/2018
EP        3379616 A        9/2018
(Continued)

OTHER PUBLICATIONS

Search Report for European Patent Application No. 20157948.9, dated Jul. 21, 2020.

(Continued)

*Primary Examiner* — Wyatt P McConnell
(74) *Attorney, Agent, or Firm* — Merchant & Gould P.C.

(57) ABSTRACT

The positive electrode material for a lithium ion polymer battery of the present invention is active material particles including core particles represented by General Formula $Li_xA_yD_zPO_4$ and the carbonaceous film that coats surfaces of the core particles, wherein a paste including the active material particles has a viscosity of 5,000 mPa·s or less when a viscosity of the paste is measured at a shear rate of 4.0 [1/s], wherein the paste is a mixture of the active material particles, an ion-conductive polymer, a conductive auxiliary agent and a solvent, in which the active material particles, the ion-conductive polymer and the conductive auxiliary agent are included in the paste in a mass ratio of 66:30:4, and a total solid content of the paste is 40% by mass.

13 Claims, 2 Drawing Sheets

(51) Int. Cl.
    *H01M 4/587* (2010.01)
    *H01M 4/62* (2006.01)
    *H01M 10/0525* (2010.01)
    *H01M 4/02* (2006.01)

(52) U.S. Cl.
    CPC ....... *H01M 4/625* (2013.01); *H01M 10/0525* (2013.01); *H01M 2004/021* (2013.01); *H01M 2004/028* (2013.01)

(56) References Cited

FOREIGN PATENT DOCUMENTS

| | | | |
|---|---:|---|---|
| EP | 3462522 | A | 4/2019 |
| JP | 2005-183287 | A | 7/2005 |
| JP | 2007-280687 | A | 10/2007 |
| JP | 2009-004371 | A | 1/2009 |
| JP | 2011-049161 | A | 3/2011 |
| JP | 2012-104290 | A | 5/2012 |
| JP | 2019-061932 | A | 4/2019 |
| JP | 6497462 | B | 4/2019 |

OTHER PUBLICATIONS

Office Action for Japanese Patent Application No. 2019-175384, dated Mar. 24, 2020.

\* cited by examiner

POSITIVE ELECTRODE MATERIAL FOR LITHIUM ION POLYMER BATTERY, POSITIVE ELECTRODE FOR LITHIUM ION POLYMER BATTERY, AND LITHIUM ION POLYMER BATTERY

This application claims the benefit of Japanese Patent Application No. 2019-175384 filed Sep. 26, 2019, the disclosure of which is herein incorporated by reference in its entirety.

BACKGROUND OF THE INVENTION

Field of the Invention

The present invention relates to a positive electrode material for a lithium ion polymer battery, a positive electrode for a lithium ion polymer battery, and a lithium ion polymer battery.

Description of Related Art

In recent years, as batteries anticipated to have a small size, a high capacity and a less weight, non-aqueous electrolyte solution-based secondary batteries such as lithium ion secondary batteries have been proposed and put into practical use. Lithium ion secondary batteries are constituted of a positive electrode and a negative electrode which have properties capable of reversibly intercalating and deintercalating lithium ions, and a non-aqueous electrolyte.

As negative electrode active materials for negative electrode materials of lithium ion secondary batteries, generally, carbon-based materials or Li-containing metal oxides having properties capable of reversibly intercalating and deintercalating lithium ions are used. Examples of Li-containing metal oxides include lithium titanate ($Li_4Ti_5O_{12}$).

Meanwhile, as positive electrodes of lithium ion secondary batteries, positive electrode material mixtures including a positive electrode material, a binder, and the like are used. As a positive electrode active material, for example, Li-containing metal oxides having properties capable of reversibly intercalating and deintercalating lithium ions such as lithium iron phosphate ($LiFePO_4$) are used. In addition, positive electrodes of lithium ion secondary batteries are formed by applying the positive electrode material mixture onto the surface of a metal foil that is called an electrode current collector.

As electrolyte solutions for a lithium ion secondary battery, non-aqueous solvents are used. Non-aqueous solvents enable the application of positive electrode active materials that are oxidized and reduced at a high potential or negative electrode active materials that are oxidized and reduced at a low potential. Therefore, lithium ion secondary batteries having a higher voltage can be realized.

These lithium ion secondary batteries have a smaller size, higher energy and less weight than secondary batteries in the related art such as lead batteries, nickel cadmium batteries, and nickel metal hydride secondary batteries. Therefore, lithium ion secondary batteries are used not only as small-sized power supplies used in portable electronic devices such as mobile phones and notebook personal computers but also as large-sized stationary emergency power supplies.

In recent years, there has been a demand for the performance improvement of lithium ion secondary batteries, and a variety of studies have been carried out for the performance improvement. For example, in order to further improve the safety of lithium ion secondary batteries, all-solid state batteries using non-volatile polymer electrolyte membranes or using inorganic solid electrolytes or batteries using ionic liquids, without using a combustible organic solvent as the electrolyte, are being studied. Among these, lithium ion polymer (secondary) batteries using polymer electrolyte membranes are actively studied because a production process by painting in the same way as in batteries using conventional liquid electrolytes can be applied, the price is low, the conductivity of the polymer electrolyte membrane is high, and thinning is easy. Furthermore, because the polymer electrolyte membrane has a dense solid state, the formation of acicular metal crystals called dendrites is suppressed in the polymer electrolyte membrane. Accordingly, in the lithium ion polymer battery, since a lithium metal negative electrode can be used without impairing safety, a drastic improvement in capacity can be expected.

In order to improve the performance of the lithium ion polymer battery, not only the ion conductivity of the polymer electrolyte membrane but also the electron conductivity is required to be further improved. Regarding the above-described property demands, techniques for coating the surfaces of positive electrode active materials with a carbonaceous material (hereinafter, in some cases, referred to as "carbonaceous film") are known (for example, refer to Japanese Laid-open Patent Publication No. 2009-004371, Japanese Laid-open Patent Publication No. 2011-049161, and Japanese Laid-open Patent Publication No. 2012-104290). As a method for coating the surface of a positive electrode active material with a carbonaceous film, methods in which a positive electrode active material and a carbon source are mixed together and this mixture is calcinated in an inert atmosphere or a reducing atmosphere are known.

SUMMARY OF THE INVENTION

When pores are present in an agglomerate (granule) of the primary particles (active material particles) of the positive electrode active material coated with the carbonaceous film, a polymer electrolyte containing a highly viscous polymer is difficult to sufficiently penetrate inside of the pores. Therefore, in this case, active material particles that are not in direct contact with the polymer electrolyte may be generated. Since these active material particles do not show an electrochemical reactivity due to the fact that the supply of Li ions is insufficient, the battery capacity is reduced. In addition, since such pores preferentially take in a solvent having a lower molecular weight, a solvent ratio around the agglomerate decreases, a polymer ratio increases, and the viscosity of a paste for forming an electrode (electrode material paste) increases. In addition, since the pores in the agglomerate also become pores in electrodes, and the energy density of an electrode per unit volume decreases.

In addition, by cracking the granules (excluding pores), an increase in the viscosity of the paste and a decrease in the binding property can be suppressed. However, in a case where the intensity during cracking the granules (cracking intensity) is too strong, the carbonaceous film is peeled off from the surface of the primary particles of the positive electrode active material, the electron conductivity of the electrode decreases, and the paste viscosity increases due to the increase of the specific surface area of the positive electrode active material. In a case where the electron conductivity of the electrode decreases, input and output characteristics of the battery or the battery capacity after charge and discharge cycles decreases. In addition, in a case where the paste viscosity increases, the coated surface may become rough and the structure of the electrode may become uneven due to the nonuniformity of coating thicknesses when coating the electrode current collector with the paste. On the other hand, in a case where the cracking intensity is too weak, the pores remain in electrodes, and the energy density of the electrodes per unit volume decreases.

For the above-described reasons, it is most preferable to crack the granules to necessary agglomerate particle sizes while guaranteeing the electron conductivity by suppressing the peeling of the carbonaceous film. However, the cracking intensity at which the carbonaceous film begins to peel off varies depending on the primary particle diameter of the positive electrode active material, the amount of carbon included in the positive electrode material, or the like, and thus it is difficult to optimally control the cracking intensity.

The present invention has been made in consideration of the above-described circumstances, and an object of the present invention is to provide a positive electrode material for a lithium ion polymer battery which suppresses the peeling of a carbonaceous film that coats the surfaces of primary particles of a positive electrode active material and is capable of improving the positive electrode density while guaranteeing the electron conductivity, a positive electrode for a lithium ion polymer battery including the positive electrode material for a lithium ion polymer battery, and a lithium ion polymer battery including the positive electrode for a lithium ion polymer battery.

The present inventors carried out intensive studies in order to achieve the above-described object, consequently found that, in active material particles including core particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and a carbonaceous film that coats surfaces of the core particles, wherein a paste including the active material particles can have a viscosity of 5,000 mPa·s or less when a viscosity of the paste is measured at a shear rate of 4.0 [1/s], wherein the paste is a mixture of the active material particles, an ion-conductive polymer, a conductive auxiliary agent and a solvent, in which the active material particles, the ion-conductive polymer and the conductive auxiliary agent are included in the paste in a mass ratio of 66:30:4, and a total solid content of the paste is 40% by mass, it is possible to suppress the peeling of the carbonaceous film that coats the surfaces of primary particles of a positive electrode active material and provide a positive electrode material for a lithium ion polymer battery capable of improving the positive electrode density while guaranteeing the electron conductivity, and completed the present invention.

Here, the ion-conductive polymer can be obtained by dissolving a lithium salt in a coordination polymer such as polyethylene oxide or a modified polyethylene oxide.

The positive electrode material for a lithium ion polymer battery of the first aspect of the present invention consists of active material particles which includes core particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and a carbonaceous film that coats surfaces of the core particles, wherein a paste including the active material particles has a viscosity of 5,000 mPa·s or less, when a viscosity of the paste is measured at a shear rate of 4.0 [1/s], wherein the paste is a mixture of the active material particles, an ion-conductive polymer, a conductive auxiliary agent and a solvent, in which the active material particles, the ion-conductive polymer and the conductive auxiliary agent are included in the paste in a mass ratio of 66:30:4, and a total solid content of the paste is 40% by mass.

The positive electrode for a lithium ion polymer battery of the second aspect of the present invention is a positive electrode for a lithium ion polymer battery including an electrode current collector and a positive electrode mixture layer formed on the electrode current collector, in which the positive electrode mixture layer includes the positive electrode material for a lithium ion polymer battery of the present invention.

The lithium ion polymer battery of the third aspect of the present invention includes the positive electrode for a lithium ion polymer battery of the present invention.

According to the positive electrode material for a lithium ion polymer battery of the present invention, the positive electrode material for a lithium ion polymer battery has a characteristic wherein when a viscosity of a paste including the active material particles is measured at a shear rate of 4.0 [1/s], the paste has a viscosity of 5,000 mPa·s or less, wherein the paste is prepared by dissolving the active material particles, an ion-conductive polymer, a conductive auxiliary agent in a solvent at a mass ratio of 66:30:4, and a total solid content of the paste is 40% by mass. Accordingly, it is possible to suppress the peeling of the carbonaceous film that coats the surfaces of the core particles and provide positive electrode materials for a lithium ion polymer battery capable of improving the positive electrode density while guaranteeing the electron conductivity.

According to the positive electrode for a lithium ion polymer battery of the present invention, since the positive electrode material for a lithium ion polymer battery of the present invention is included, lithium ion polymer batteries having a high energy density and excellent input and output characteristics can be obtained.

Since the lithium ion polymer battery of the present invention includes the positive electrode material for a lithium ion polymer battery of the present invention, lithium ion polymer batteries having a high energy density and excellent input and output characteristics can be obtained.

DETAILED DESCRIPTION OF THE INVENTION

Figure 1:
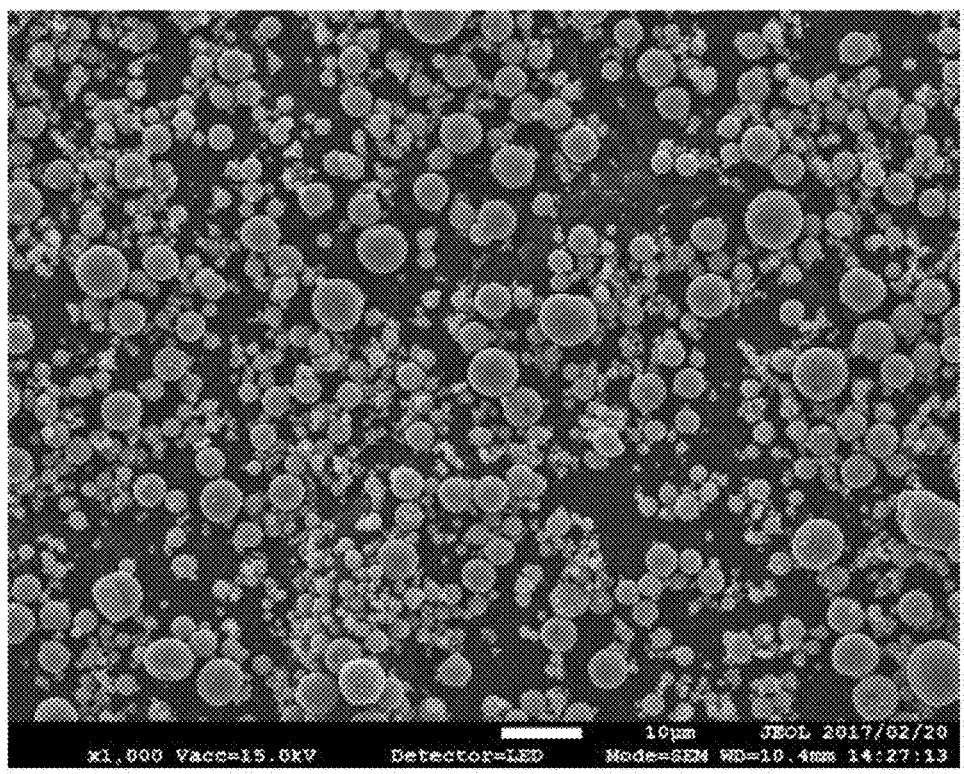
FIG. 1 is a scanning electron microscopic image illustrating agglomerates.

Preferable examples of embodiments of a positive electrode material for a lithium ion polymer battery, a positive electrode for a lithium ion polymer battery, and a lithium ion polymer battery of the present invention will be described.

Meanwhile, the present embodiment is a specific description for better understanding of the gist of the present invention and does not limit the present invention unless particularly otherwise described. Modification, omission, substitution, addition, and other modification are possible within the scope of the gist of the present invention.

Positive Electrode Material for Lithium Ion Polymer Battery

In a positive electrode material for a lithium ion polymer battery of the present embodiment (hereinafter, in some cases, simply referred to as "positive electrode material"), active material particles include core particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and a carbonaceous film that coats surfaces of the core particles, and when a viscosity of a paste including the active material particles is measured at a shear rate of 4.0 [1/s], the paste has a viscosity of 5,000 mPa·s or less. The paste is prepared as a mixture of the active material particles, an ion-conductive polymer, a conductive auxiliary agent and a solvent, in which the active material particles, the ion-conductive polymer and the conductive auxiliary agent are included in the paste in a mass ratio of 66:30:4, and a total solid content of the paste is 40% by mass.

The positive electrode material for a lithium ion polymer battery of the present embodiment has characteristics wherein when the positive electrode material is evaluated such that a viscosity of the paste including the active material particles is measured at a shear rate of 4.0 [1/s], the paste has a viscosity of 5,000 mPa·s or less, wherein the paste is a mixture of the active material particles, an ion-conductive polymer, a conductive auxiliary agent and a solvent, in which the active material particles, the ion-conductive polymer and the conductive auxiliary agent are included in the paste in a mass ratio of 66:30:4, and a total solid content of the paste is 40% by mass. It is preferable that the viscosity is 4,000 mPa·s or less, and more preferably 3,000 mPa·s or less. Meanwhile, the lower limit of the viscosity when the shear rate of the paste is 4.0 [1/s] is not particularly limited, and the viscosity may be 1,000 mPa·s or more or 1,500 mPa·s or more.

In a case where the viscosity exceeds 5,000 mPa·s when the shear rate of the paste is 4.0 [1/s], during the application of the positive electrode material paste to an electrode current collector, the electrode internal structure becomes uneven due to the variation of the coating thickness, and it becomes impossible to realize sufficient charge and discharge rate performance.

In the present embodiment, examples of a method for measuring the viscosity of the paste include a method in which a dynamic viscoelasticity measurement instrument such as a dynamic viscoelasticity measurement instrument (Model No.: RS-6000, manufactured by Thermo Fisher Scientific Inc.) is used, wherein the measurement temperature is 25° C., the shear rate is increased in a range from 0.01 [1/s] to 20 [1/s], and the viscosity is scanned at an appropriate shear rate.

The powder resistance value (powder resistivity) of the positive electrode material for a lithium ion battery is preferably 100 Ω·cm or less and more preferably 80 Ω·cm or less.

In a case where the powder resistance value is 100 Ω·cm or less, it is possible to improve the electron conductivity of the positive electrode material and a positive electrode mixture layer formed on the electrode current collector.

The powder resistance value can be measured from a specimen obtained by shaping the positive electrode material at a pressure of 50 MPa and, specifically, can be measured using a method described in Example.

The average primary particle diameter of the positive electrode material (active material particle) for a lithium ion polymer battery of the present embodiment is preferably 10 nm or more and 400 nm or less, and more preferably 20 nm or more and 300 nm or less.

When the average primary particle diameter of the positive electrode material is 10 nm or more, the specific surface area of the positive electrode material increases, and thus an increase in the mass of necessary carbon is suppressed, and it is possible to suppress a decrease in the charge and discharge capacity of lithium ion polymer batteries. Meanwhile, in a case where the average primary particle diameter of the positive electrode material is 400 nm or less, it is possible to suppress the extension of time for lithium ions or electrons to migrate in the positive electrode material. As a result, is possible to suppress an increase in the internal resistance of lithium ion polymer batteries and the consequent deterioration of the output characteristics.

Here, the average particle diameter refers to the volume-average particle diameter. The average primary particle diameter of the primary particles of the positive electrode material can be measured using a laser diffraction and scattering particle size distribution measurement instrument. In addition, it is also possible to randomly select a plurality of primary particles observed using a scanning electron microscope (SEM) and calculate the average particle diameter of the primary particles.

The BET specific surface area of the positive electrode material for a lithium ion polymer battery is preferably 5 $m^2/g$ or more and 25 $m^2/g$ or less.

In a case where the BET specific surface area is 5 $m^2/g$ or more, the coarsening of the positive electrode material is suppressed, and it is possible to increase the diffusion rate of lithium ions in the particles. As a result, it is possible to improve the battery characteristics of lithium ion polymer batteries. Meanwhile, when the BET specific surface area is 25 $m^2/g$ or less, it is possible to increase the positive electrode density in positive electrodes including the positive electrode material for a lithium ion polymer battery of the present embodiment. Accordingly, it is possible to provide lithium ion polymer batteries having a high energy density.

The BET specific surface area of the positive electrode material for a lithium ion polymer battery can be measured using a method described in Example.

The amount of carbon included in the positive electrode material for a lithium ion polymer battery, that is, the amount of carbon forming the carbonaceous film is preferably 0.1 parts by mass or more and 10 parts by mass or less, and more preferably 0.6 parts by mass or more and 3 parts by mass or less with respect to 100 parts by mass of the core particles.

In a case where the amount of carbon is 0.1 parts by mass or more, the discharge capacity at a high charge-discharge rate of lithium ion polymer batteries increases, and it is possible to realize sufficient charge and discharge rate performance. On the other hand, in a case where the amount of carbon is 10 parts by mass or less, it is possible to suppress the battery capacity of lithium ion polymer batteries per unit mass of the positive electrode material being decreased more than necessary.

The amount of carbon included in the positive electrode material for a lithium ion polymer battery can be measured using a method described in Example.

Figure 2:
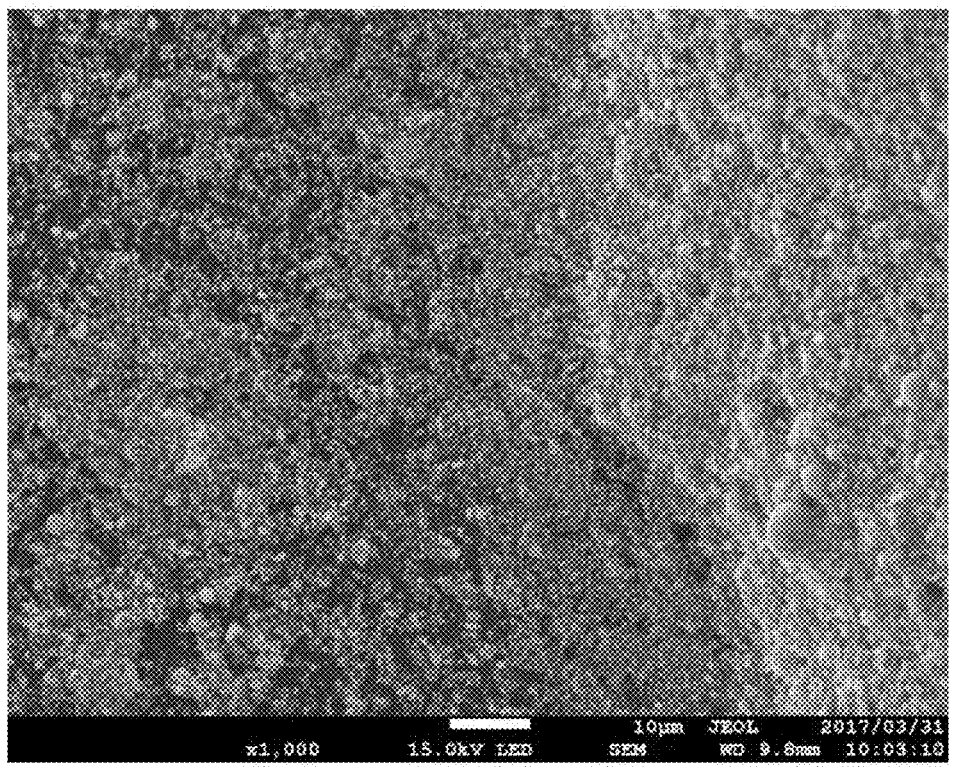
FIG. 2 is a scanning electron microscopic image illustrating cracked particles.
Figure 3:
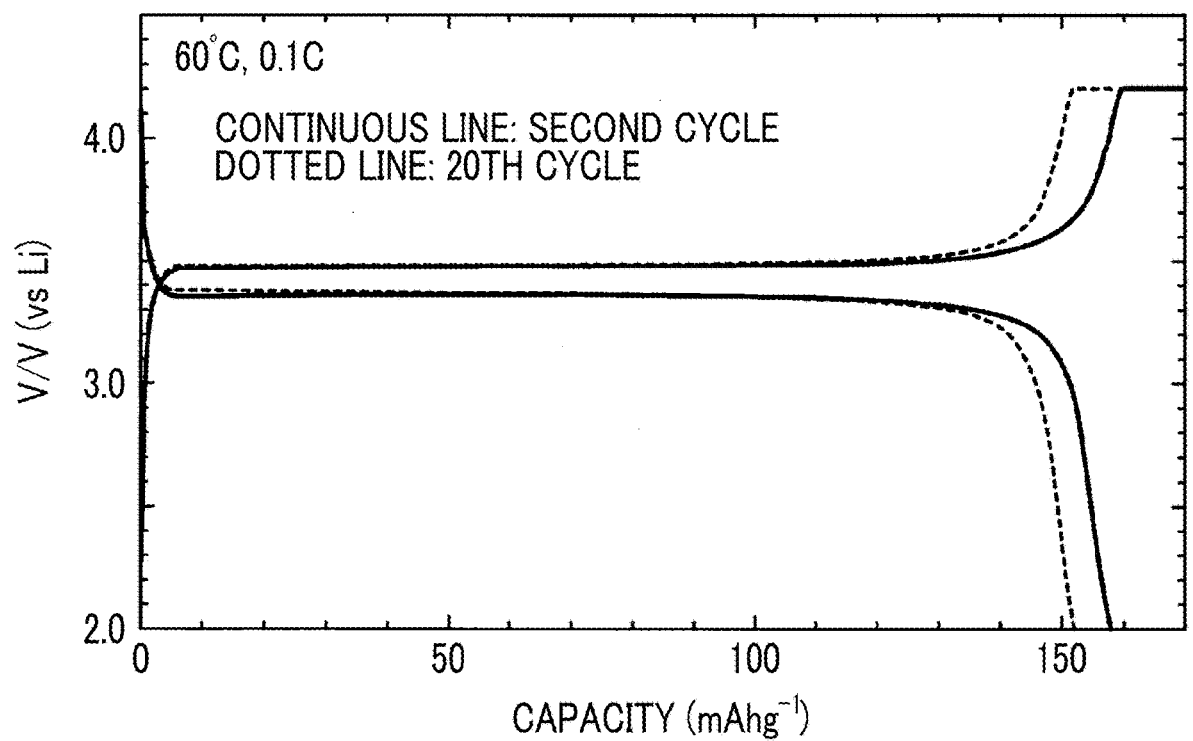
FIG. 3 is a graph showing a charge and discharge curve at a second cycle of the lithium ion polymer battery of Example 6.

In addition, the positive electrode material fora lithium ion polymer battery of the present embodiment is cracked particles which are produced using a method for producing a positive electrode material for a lithium ion polymer battery described below and are formed by cracking active material particles made of agglomerates of primary particles. In the positive electrode material for a lithium ion polymer battery of the present embodiment, the agglomerate refers to a substance allowing the differentiation of individual secondary particles in particle shapes observed using a scanning electron microscope (SEM) at a magnification of 1,000 times as illustrated in FIG. 1. On the other hand, the cracked particles refer to a substance in a state in which the differentiation of individual particles is not allowed in particle shapes observed using a scanning electron microscope (SEM) at a magnification of 1,000 times as illustrated in FIG. 2.

The positive electrode material for a lithium ion polymer battery of the present embodiment preferably has a peak (maximum) of coarse particles and a peak (maximum) of fine particles in the particle size distribution. The particle size distribution of the positive electrode material of the present embodiment preferably has at least two peaks. For example, a coarse particle-side peak and a fine particle-side peak may be included in the particle size distribution.

In the positive electrode material for a lithium ion polymer battery of the present embodiment, the ratio (coarse particle ratio) of an area surrounded by a curve indicating the peak (maximum) shape of the coarse particles (coarse particle-side peak area) to the sum of the area surrounded by the curve indicating the peak (maximum) shape of the coarse particles and an area surrounded by a curve indicating the peak (maximum) shape of the fine particles (fine particle-side peak area) is preferably 35% or more and 65% or less, and more preferably 40% or more and 60% or less.

In a case where the coarse particle ratio is 35% or more, the peeling of the carbonaceous film is suppressed, and thus the electron conductivity of the positive electrode material improves, and it is possible to realize sufficient charge and discharge rate performance. In a case where the coarse particle ratio is 65% or less, it becomes possible to densely fill positive electrodes with the positive electrode active material (core particles) during the production of the positive electrodes including the positive electrode material for a lithium ion polymer battery, and the energy density per unit volume of the positive electrodes improves.

The coarse particle ratio in the particle size distribution can be measured using a laser diffraction and scattering particle size distribution measurement instrument or the like and can be calculated from the peak area on the coarse particle side and the peak area on the fine particle side of a bimodal particle size distribution.

The median diameter of the positive electrode material for a lithium ion polymer battery is preferably 0.50 µm or more and 0.80 µm or less, and more preferably 0.55 µm or more and 0.75 µm or less.

In case where the median diameter is 0.50 µm or more, it is possible to prevent the degradation of the electron conductivity caused by excess cracking. Meanwhile, in a case where the median diameter is 0.80 µm or less, it becomes possible to densely fill positive electrodes with the positive electrode active material (core particles) during the production of the positive electrodes including the positive electrode material for a lithium ion polymer battery, and the energy density per unit volume improves.

The median diameter refers to the particle diameter at a point at which the distribution curve of the integral percentage in the particle size distribution intersects the horizontal axis at 50%.

The median diameter of the positive electrode material for a lithium ion polymer battery can be measured using a method described in Example.

In addition, the coarse particle ratio of the positive electrode material for a lithium ion polymer battery can be measured using a method described in Example.

The positive electrode material for a lithium ion polymer battery of the present embodiment is a positive electrode material which is produced using a method for producing a positive electrode material for a lithium ion polymer battery described below and is formed by cracking active material particles made of the agglomerates of primary particles. The maximum value (peak) of the fine particles of a fine particle-side peak in the particle size distribution is preferably in a range of 0.15 µm or more and 0.35 µm or less, and more preferably 0.18 µm or more and 0.32 µm or less.

In a case where the maximum value of the fine particles in the particle size distribution is 0.15 µm or more and 0.35 µm or less, the electron conductivity of the positive electrode material in which the peeling of the carbonaceous film that coats the surfaces of the primary particles of the core particles is suppressed improves.

The maximum value (peak) of the coarse particles of a coarse particle-side peak in the particle size distribution of the positive electrode material for a lithium ion polymer battery is preferably in a range of 0.80 µm or more and 1.20 µm or less, and more preferably 0.85 µm or more and 1.15 µm or less.

In a case where the maximum value of the coarse particles in the particle size distribution is 0.80 µm or more and 1.20 µm or less, it becomes possible to densely fill positive electrodes with the positive electrode material during the production of the positive electrodes including the positive electrode material for a lithium ion polymer battery, and the energy density per unit volume of the positive electrodes improves.

The chromaticity b* in the L*a*b* color system of the positive electrode material for a lithium ion polymer battery is preferably 1.9 or more and 2.3 or less, and more preferably 1.95 or more and 2.3 or less.

The chromaticity b* of the positive electrode material for a lithium ion polymer battery is an index indicating the degree of coating of the core particles with the carbonaceous film.

In a case where the chromaticity b* is 1.9 or more, it becomes possible to densely fill positive electrodes with the positive electrode active material (core particles) during the production of the positive electrodes including the positive electrode material fora lithium ion polymer battery, and the energy density per unit volume improves. Meanwhile, in a case where the chromaticity b* is 2.3 or less, in the positive electrode material for a lithium ion polymer battery, it is possible to set the degree of exposure of core particles that are not coated with the carbonaceous film in a range enough to increase the energy density per unit volume, and it is possible to prevent the electron conductivity from being decreased due to excessive cracking.

The chromaticity b* in the L*a*b* color system of the positive electrode material for a lithium ion polymer battery can be measured using a method described in the examples.

The proportion of the amount of carbon in the specific surface area of the positive electrode material for a lithium ion polymer battery ("[the amount of carbon]/[the specific surface area of the positive electrode material]"; hereinafter, referred to as "carbon supporting amount ratio") is preferably 0.05 mass·g/m² or more and 0.15 mass·g/m² or less, and more preferably 0.06 mass·g/m² or more and 0.13 mass·g/m² or less.

In a case where the carbon supporting amount ratio is 0.05 mass·g/m² or more, the discharge capacity at a high charge-discharge rate of lithium ion polymer batteries increases, and it is possible to realize sufficient charge and discharge rate performance. On the other hand, in a case where the carbon supporting amount ratio is 0.15 mass·g/m² or less, it is possible to suppress the battery capacity of lithium ion polymer batteries per unit mass of the positive electrode material being decreased more than necessary.

Core Particles

The core particles constituting the positive electrode material for a lithium ion polymer battery of the present embodiment are made of a positive electrode active material represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).

Examples of compounds represented by General Formula $Li_xA_yD_zPO_4$ include $LiFePO_4$, $LiMnPO_4$, $LiCoPO_4$, $LiFeMnPO_4$, $LiMnZnPO_4$, and the like.

The average primary particle diameter of the primary particles of the core particles constituting the positive electrode material particles for a lithium ion polymer battery of the present embodiment is preferably 5 nm or more and 800 nm or less, and more preferably 20 nm or more and 500 nm or less.

In a case where the average primary particle diameter of the primary particles of the core particles is 5 nm or more, it is possible to sufficiently coat the surfaces of the primary particles of the core particles with the carbonaceous film. In addition, it is possible to increase the discharge capacity of lithium ion polymer batteries during high-speed charge and discharge and realize sufficient charge and discharge performance. On the other hand, in a case where the average primary particle diameter of the primary particles of the core particles is 800 nm or less, it is possible to decrease the internal resistance of the primary particles of the core particles. In addition, it is possible to increase the discharge capacity of lithium ion polymer batteries during high-speed charge and discharge.

Carbonaceous Film

The carbonaceous film coats the surfaces of the core particles.

In a case where the surfaces of the core particles are coated with the carbonaceous film, it is possible to improve the electron conductivity of the positive electrode material for a lithium ion polymer battery.

The carbonaceous film is a pyrolytic carbonaceous film derived from a heat-treated organic compound, and the thickness of the carbonaceous film is preferably 0.2 nm or more and 10 nm or less, and more preferably 0.5 nm or more and 4 nm or less.

In a case where the thickness of the carbonaceous film is 0.2 nm or more, it is possible to prevent the excessively thin thickness of the carbonaceous film from disabling the formation of films having a desired resistance value. In addition, it is possible to ensure conductivity suitable for the positive electrode material for a lithium ion polymer battery. On the other hand, in a case where the thickness of the carbonaceous film is 10 nm or less, it is possible to suppress a decrease in the battery capacity per unit mass of the positive electrode material for a lithium ion polymer battery.

In addition, in a case where the thickness of the carbonaceous film is 0.2 nm or more and 10 nm or less, it becomes easy to closely pack the positive electrode material for a lithium ion polymer battery, and thus the amount of the positive electrode material for a lithium ion polymer battery packed per unit volume of the positive electrode increases. As a result, it is possible to increase the positive electrode density, and high-capacity lithium ion polymer batteries can be obtained.

The coating ratio of the carbonaceous film to the core particles is preferably 60% or more and 95% or less, and more preferably 80% or more and 95% or less. In a case where the coating ratio of the carbonaceous film is 60% or more, the coating effect of the carbonaceous film can be sufficiently obtained.

The density of the carbonaceous film, which is calculated using the carbon component in the carbonaceous film, is preferably 0.3 g/cm³ or more and 1.5 g/cm³ or less, and more preferably 0.4 g/cm³ or more and 1.0 g/cm³ or less.

Here, the reasons for limiting the density of the carbonaceous film, which is calculated using the carbon amount in the carbonaceous film, to the above-described range are as described below. In a case where the density of the carbonaceous film, which is calculated using the carbon amount in the carbonaceous film, is 0.3 g/cm³ or more, the carbonaceous film exhibits sufficient electron conductivity. On the other hand, in a case where the density of the carbonaceous film is 1.5 g/cm³ or less, the amount of the fine crystals of graphite made of a lamellar structure included in the carbonaceous film is small, and thus no steric hindrance is generated by the fine crystals of the graphite during the diffusion of lithium ions in the carbonaceous film. Accordingly, there are no cases in which the lithium ion migration resistance increases. As a result, there are no cases in which the internal resistance of lithium ion polymer batteries increases, and voltage drop does not occur at a high charge-discharge rate of lithium ion polymer batteries.

According to the positive electrode material for a lithium ion polymer battery of the present embodiment, the active material particles includes the core particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and the carbonaceous film that coats the surfaces of the core particles. The positive electrode material has a characteristic wherein when a paste including the active material particles is prepared and a viscosity of the paste is measured at a shear rate of 4.0 [1/s], the paste has a viscosity of 5,000 mPa·s or less, wherein the paste is a mixture of the active material particles, an ion-conductive polymer, a conductive auxiliary agent and a solvent, in which the active material particles, the ion-conductive polymer and the conductive auxiliary agent are included in the paste in a mass ratio of 66:30:4, and a total solid content of the paste is 40% by mass. Thus it is possible to suppress the peeling of the carbonaceous film that coats the surfaces of the primary particles of the positive electrode active material (core particles) and provide positive electrode materials for a lithium ion polymer battery capable of improving the positive electrode density while guaranteeing the electron conductivity.

Method for Producing Positive Electrode Material for Lithium Ion Polymer Battery The positive electrode material for a lithium ion polymer battery of the present embodiment can be produced by cracking active material particles made of agglomerates.

Method for Producing Active Material Particle

The method for producing active material particles in the present embodiment includes, for example, a production process of the core particles and a precursor of the core particles, a slurry preparation process of preparing a slurry by mixing at least one core particle raw material selected from the group consisting of the core particles and the precursor of the core particles, an organic compound which is a carbonaceous film precursor, and water, and a calcination process of drying the slurry and calcinating the obtained dried substance in a non-oxidative atmosphere.

Process of Producing Core Particles and Precursor of Core Particles

As a method for producing the compound (the core particles) represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$), a method of the related art such as a solid phase method, a liquid phase method, or a gas phase method is used. Examples of $Li_xA_yD_zPO_4$ obtained using the above-described method include particulate substances (hereinafter, in some cases, referred to as "$Li_xA_yD_zPO_4$ particles").

The $Li_xA_yD_zPO_4$ particles are obtained by, for example, hydrothermally synthesizing a slurry-form mixture obtained by mixing a Li source, an A source, a P source, water, and, as necessary, a D source. By means of the hydrothermal synthesis, $Li_xA_yD_zPO_4$ is generated as a precipitate in water. The obtained precipitate may be a precursor of $Li_xA_yD_zPO_4$. In this case, target $Li_xA_yD_zPO_4$ particles are obtained by calcinating the precursor of $Li_xA_yD_zPO_4$.

In this hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like. Among these, as the Li source, at least one selected from the group consisting of lithium acetate, lithium chloride, and lithium hydroxide is preferably used.

Examples of the A source include chlorides, carboxylates, sulfates, and the like which include at least one element selected from the group consisting of Co, Mn, Ni, Fe, Cu, and Cr. For example, in a case where A in $Li_xA_yD_zPO_4$ is Fe, examples of the Fe source include divalent iron salts such as iron (II) chloride ($FeCl_2$), iron (II) acetate ($Fe(CH_3COO)_2$), and iron (II) sulfate ($FeSO_4$). Among these, as the Fe source, at least one selected from the group consisting of iron (II) chloride, iron (II) acetate, and iron (II) sulfate is preferably used.

Examples of the D source include chlorides, carboxylates, sulfates, and the like which include at least one element selected from the group consisting of Mg, Ca, Sr, Ba, Ti, Zn, B, Al, Ga, In, Si, Ge, Sc, and Y.

Examples of the P source include phosphoric acid compounds such as phosphoric acid ($H_3PO_4$), ammonium dihydrogen phosphate ($NH_4H_2PO_4$), diammonium hydrogen phosphate (($NH_4)_2HPO_4$), and the like. Among these, as the P source, at least one selected from the group consisting of phosphonic acid, ammonium dihydrogen phosphate, and diammonium hydrogen phosphate is preferably used.

Slurry Preparation Process

By means of the slurry preparation process, the organic compound which is the precursor of the carbonaceous film is interposed among the core particles, and the organic compound and the core particles are uniformly mixed together, and thus the surfaces of the core particles can be uniformly coated with the organic compound.

Furthermore, by means of the calcination process, the organic compound that coats the surfaces of the core particles is carbonized, thereby obtaining active material particles (positive electrode material) including the core particles that are uniformly coated with the carbonaceous film.

The organic compound that is used in the method for producing active material particles in the present embodiment is not particularly limited as long as the compound is capable of forming the carbonaceous film on the surfaces of the core particles. Examples of the above-described organic compound include divalent alcohols such as polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, a polyether, dihydric alcohols such as ethylene glycol, trihydric alcohols such as glycerin, and the like.

In the slurry preparation process, the core particle raw material and the organic compound are dissolved or dispersed in water, thereby preparing a homogeneous slurry.

In the dissolution or dispersion of these raw materials in water, it is also possible to add a dispersant thereto.

A method for dissolving or dispersing the core particle raw material and the organic compound in water is not particularly limited as long as the core particle raw material is dispersed in water and the organic compound is dissolved or dispersed in water. The above-described method is preferably a method in which a medium stirring-type dispersion device that stirs medium particles at a high rate such as a planetary ball mill, an oscillation ball mill, a bead mill, a paint shaker, or an attritor is used.

In a case where the core particle raw material and the organic compound are dissolved or dispersed in water, it is preferable to disperse the core particle raw material in water in a primary particle form, then, add the organic compound to water, and stir the organic compound so as to be dissolved or dispersed. In such a case, the surfaces of the primary particles of the core particle raw material are easily coated with the organic compound. As a result, the organic compound is uniformly dispersed on the surfaces of the primary particles of the core particle raw material, and consequently, the surfaces of the primary particles of the core particles are coated with the carbonaceous film derived from the organic compound.

Calcination Process

Next, the slurry prepared in the slurry preparation process is sprayed and dried in a high-temperature atmosphere, for example, in the atmosphere of 70° C. or higher and 250° C. or lower.

Next, the obtained dried substance is calcinated in a non-oxidative atmosphere at a temperature of preferably 500° C. or higher and 1,000° C. or lower, and more preferably 600° C. or higher and 1,000° C. or lower for 0.1 hours or longer and 40 hours or shorter.

The non-oxidative atmosphere is preferably an atmosphere filled with an inert gas such as nitrogen ($N_2$), argon (Ar), or the like. In a case where it is necessary to further suppress the oxidation of the dried substance, a reducing atmosphere including approximately several percentages by volume of a reducing gas such as hydrogen ($H_2$) is preferable. In addition, for the purpose of removing organic components evaporated in the non-oxidative atmosphere during the calcination, a combustion-supporting or combustible gas such as oxygen ($O_2$) may be introduced into the non-oxidative atmosphere.

Here, in a case where the calcination temperature is set to 500° C. or higher, it is easy for the organic compound in the dried substance to be sufficiently decomposed and reacted, and the organic compound is easily and sufficiently carbonized. As a result, it is easy to prevent the generation of a high-resistance decomposed substance of the organic compound in the obtained agglomerates. On the other hand, in a case where the calcination temperature is set to 1,000° C. or lower, lithium (Li) in the core particle raw material is not easily evaporated, and the particle growth of the core particles to a size that is equal to or larger than the target size is suppressed. As a result, in a case where lithium ion polymer batteries including a positive electrode including the positive electrode material of the present embodiment are produced, it is possible to prevent the discharge capacity at a high charge-discharge rate from being decreased, and it is possible to realize lithium ion polymer batteries having sufficient charge and discharge rate performance.

By means of the above-described processes, active material particles made of agglomerates in which the surfaces of the primary particles of the core particles are coated with a pyrolytic carbonaceous film generated by the thermal decomposition of the organic compound in the dried substance are obtained.

Cracking Process of Active Material Particles

Next, at least some of the active material particles made of the agglomerates are cracked. Here, in order to "crack at least some of the active material particles made of the agglomerates", at least some of the agglomerates need to be cracked, and not all of the agglomerates need to be cracked.

A device that is used for the cracking of the agglomerates needs to be capable of cracking not all of the agglomerates but some of the agglomerates, and, for example, an air flow-type fine crusher such as a dry-type ball mill, a wet-type ball mill, a mixer, or a jet mill, an ultrasonic crusher, or the like is used.

In the present embodiment, a jet mill is preferably used for the cracking since the damage of the active material particles (the core particles and the primary particles) is suppressed.

In addition, the supply rate of the agglomerates into the jet mill is preferably set to 50 g/hour or more and 1,500 g/hour or less, and the air pressure is preferably set to 0.3 MPa or more and 0.7 MPa or less. The cracking intensity can be freely adjusted by varying the supply rate of the agglomerates being injected into the jet mill. In addition, the coarse particle ratio in the particle size distribution of the positive electrode material for a lithium ion polymer battery can be adjusted by adjusting the cracking intensity. Here, in a case where the cracking intensity is strong, the coarse particle ratio becomes a small value, and the degree of exposure of core particles that are not coated with the carbonaceous film increases in the positive electrode material for a lithium ion polymer battery. The cracking intensity refers to the supply rate (g/hour) of the agglomerates when the above-described air pressure is fixed in the case of using, for example, a jet mill, and the cracking intensity becomes stronger as the supply rate decreases and becomes weaker as the supply rate increases.

Positive Electrode for Lithium Ion Polymer Battery

A positive electrode for a lithium ion polymer battery of the present embodiment (hereinafter, in some cases, referred to as "positive electrode") includes the positive electrode material for a lithium ion polymer battery of the present embodiment. In more detail, the positive electrode of the present embodiment includes an electrode current collector made of a metal foil and a positive electrode mixture layer formed on the electrode current collector, and the positive electrode mixture layer includes the positive electrode material for a lithium ion polymer battery of the present embodiment. That is, the positive electrode of the present embodiment is obtained by forming the positive electrode mixture layer on one main surface of the electrode current collector using the positive electrode material for a lithium ion polymer battery of the present embodiment.

Since the positive electrode for a lithium ion polymer battery of the present embodiment includes the positive electrode material for a lithium ion polymer battery of the present embodiment, lithium ion polymer batteries for which the positive electrode for a lithium ion polymer battery of the present embodiment is used have a high energy density and have excellent input and output characteristics.

Method for Producing Positive Electrode for Lithium Ion Polymer Battery

A method for producing the positive electrode for a lithium ion polymer battery of the present embodiment is not particularly limited as long as the positive electrode mixture layer can be formed on one main surface of the electrode current collector using the positive electrode material for a lithium ion polymer battery of the present embodiment. Examples of the method for producing the positive electrode of the present embodiment include the following method.

First, the positive electrode material for a lithium ion polymer battery of the present embodiment, an ion-conductive polymer, and a solvent are mixed together, thereby preparing positive electrode material paste (Paste A). At this time, to the positive electrode material paste in the present embodiment, a conductive auxiliary agent such as carbon black and a binding agent may be added as necessary.

Ion-Conductive Polymer

As the ion-conductive polymer, for example, polyethylene oxide, a modified polyethylene oxide and the like are suitably used. They may be used alone or used in combination.

The formulation amount of the ion-conductive polymer used to prepare the positive electrode material paste is not particularly limited, but is, for example, preferably 20 parts by mass or more and 100 parts by mass or less, and more preferably 30 parts by mass or more and 70 parts by mass or less with respect to 100 parts by mass of the positive electrode material for a lithium ion polymer battery.

In a case where the formulation amount of the ion-conductive polymer is 20 parts by mass or more, a sufficient ion conductive path is formed on the surface of the positive electrode active material, an active material that does not contribute to the reaction is not generated, and thus it is possible to suppress a decrease in the battery capacity. On the other hand, in a case where the formulation amount of the ion-conductive polymer is 100 parts by mass or less, the ion-conductive polymer is not wasted, the proportion of the active material in the electrode is not too low, and thus it is possible to suppress a decrease in the battery capacity.

Binding Agent

In a case where the ion-conductive polymer has adhesiveness, a binding agent is not necessarily required. However, as the binding agent, that is, the binder resin, for example, a polytetrafluoroethylene (PTFE) resin, a polyvinylidene fluoride (PVdF) resin, fluorine rubber, or the like is preferably used. They may be used alone or used in combination.

The formulation amount of the binding agent containing the adhesive ion-conductive polymer used to prepare the positive electrode material paste is not particularly limited, but is, for example, preferably 1 part by mass or more and 30 parts by mass or less, and more preferably 3 parts by mass or more and 20 parts by mass or less with respect to 100 parts by mass of the positive electrode material for a lithium ion polymer battery.

In a case where the formulation amount of the binding agent is 1 part by mass or more, it is possible to sufficiently improve the binding property between the positive electrode mixture layer and the electrode current collector. As a result, it is possible to prevent the positive electrode mixture layer from being cracked or dropped during the formation of the positive electrode mixture layer by means of rolling or the like. In addition, it is possible to prevent the positive electrode mixture layer from being peeled off from the electrode current collector in processes of charging and discharging lithium ion polymer batteries and prevent the battery capacity or the charge and discharge rate from being decreased. On the other hand, in a case where the formulation amount of the binding agent is 30 parts by mass or less, it is possible to prevent the internal resistance of the positive electrode material for a lithium ion polymer battery from being decreased and prevent the battery capacity at a high charge-discharge rate from being decreased.

Conductive Auxiliary Agent

The conductive auxiliary agent is not particularly limited, and, for example, at least one selected from the group consisting of particulate carbon such as acetylene black (AB), KETJEN BLACK, and furnace black and fibrous carbon such as vapor-grown carbon fiber (VGCF) and carbon nanotube is used.

Solvent

The solvent that is used in the positive electrode material paste including the positive electrode material for a lithium ion polymer battery of the present embodiment is appropriately selected depending on the properties of the binding agent. In a case where the solvent is appropriately selected, it is possible to facilitate the application of the positive electrode material paste to substances to be coated such as the electrode current collector.

Examples of the solvent include water, alcohols, esters, ethers, ketones, amides, glycols and the like.

Examples of the alcohols include methanol, ethanol, 1-propanol, 2-propanol (isopropyl alcohol: IPA), butanol, pentanol, hexanol, octanol, diacetone alcohol, and the like.

Examples of the esters include ethyl acetate, butyl acetate, ethyl lactate, propylene glycol monomethyl ether acetate, propylene glycol monoethyl ether acetate, γ-butyrolactone, and the like.

Examples of the ethers include diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether, and the like.

Examples of the ketones include acetone, methyl ethyl ketone (MEK), methyl isobutyl ketone (MIBK), acetylacetone, cyclohexanone, and the like.

Examples of the amides include dimethylformamide, N,N-dimethylacetoacetamide, N-methyl-2-pyrrolidone (NMP), and the like.

Examples of the glycols include ethylene glycol, diethylene glycol, propylene glycol, and the like.

These solvents may be used singly, or two or more thereof may be used as a mixture.

The content rate of the solvent in the positive electrode material paste is preferably 50% by mass or more and 70% by mass or less, and more preferably 55% by mass or more and 65% by mass or less in a case where the total mass of the positive electrode material for a lithium ion polymer battery of the present embodiment, the ion-conductive polymer, and the solvent is set to 100% by mass.

In a case where the content rate of the solvent in the positive electrode material paste is in the above-described range, it is possible to obtain positive electrode material paste having excellent positive electrode formability and excellent battery characteristics.

A method for mixing the positive electrode material for a lithium ion polymer battery of the present embodiment, the ion-conductive polymer, the conductive auxiliary agent, and the solvent is not particularly limited as long as these components can be uniformly mixed together. Examples thereof include mixing methods in which a kneader such as a ball mill, a sand mill, a planetary (sun-and-planet) mixer, a paint shaker, or a homogenizer is used.

The positive electrode material paste is applied to one main surface of the electrode current collector so as to form a coating film, and then this coating film is dried, thereby obtaining an electrode current collector having a coating film made of the mixture of the positive electrode material and the binding agent formed on one main surface. Thereafter, the coating film may be pressure-bonded as necessary.

Viscosity of a Paste

In the embodiment, whether or not a positive electrode material fora lithium ion polymer battery has suitable properties can be determined by measuring a viscosity of a paste (paste B). It is possible to use the paste B as the paste A as needed. The paste B can be evaluated to determine whether the active material particles is allowable. The paste B includes an active material particles (positive electrode material), an ion-conductive polymer and a conductive auxiliary agent in a mixing ratio of 66:30:4 in terms of a mass ratio in addition to a solvent, and has 40% by mass of a total solid content. When the viscosity of the paste B measured at a shear rate of 4.0 [1/s] is 5,000 mPa·s or less, it is determined that the positive electrode material is acceptable. Such a positive electrode material makes it possible to improve the positive electrode density while guaranteeing the electron conductivity and suppressing the peeling of a carbonaceous film that coats the surfaces of primary particles of the positive electrode active material. The ion-conductive polymer, the conductive auxiliary agent and the solvent included in the paste can be optionally selected, and those compounds used for the pastes A, which are used for forming a positive electrode, described above and described in Examples can be preferably used for the paste B. The manufacturing conditions, the evaluating conditions and the devices used for forming or evaluating the paste B can be optionally selected. The conditions and the devices used for the paste A can be preferably used to form and evaluate the paste B. For example, after an active material particles, an ion-conductive polymer, a conductive auxiliary agent and a solvent are mixed together in accordance with the above ratio, the mixture may be kneaded by a kneader for 30 minutes to generate a paste to be evaluated. The viscosity at a shear rate of 4.0 [1/s] may be evaluated using a dynamic viscoelasticity measurement instrument under the conditions such that the measurement temperature is 25° C., and the shear rate is increased, for example, in a range from 0.01 [1/s] to 20 [1/s]. The ion-conductive polymer used for the paste B may include at least one lithium salt, and examples thereof include lithium trifluimide, $LiPF_6$ and $LiClO_4$. The amount of the lithium salt may be optionally selected. For example, the amount of a lithium salt may be 0 to 40 part by mass with respect to 100 parts by mass of the ion-conductive polymer. Specific examples of the amount of the lithium salt include 0 to 15 part by mass, 15 to 20 parts by mass, 20 to 25 parts by mass, and 25 to 30 part mass.

Lithium Ion Polymer Battery

A lithium ion polymer battery of the present embodiment includes a positive electrode, an negative electrode, and a polymer electrolyte, in which the positive electrode is the positive electrode fora lithium ion polymer battery of the present embodiment. Specifically, the lithium ion polymer battery of the present embodiment includes the positive electrode for a lithium ion polymer battery of the present embodiment as a positive electrode, the negative electrode, and the polymer electrolyte.

In the lithium ion polymer battery of the present embodiment, the negative electrode, the polymer electrolyte, and a separator are not particularly limited.

Negative Electrode

Examples of the negative electrode include negative electrodes including an negative electrode material such as an Li metal, carbon materials such as a natural graphite and a hard carbon, an Li alloy, $Li_4Ti_5O_{12}$, $Si(Li_{4.4}Si)$, and the like.

Polymer Electrolyte

Examples of the polymer electrolyte include an electrolyte obtained by dissolving lithium salts such as lithium trifluimide (LiTFSI), $LiPF_6$, $LiClO_4$, and the like in polyethylene oxide. It is possible to suitably use a modified polyethylene oxide introduced with a crosslinkable functional group for the purpose of increasing the strength of the film, a modified polyethylene oxide introduced with a functional group for the purpose of ensuring conductivity at low temperature (preventing crystallization), or the like. It is also possible to use a copolymer of ethylene oxide and other monomer for the purpose of improving adhesiveness to the electrode current collector, improving temperature characteristics, improving oxidation resistance, or the like.

Since the lithium ion polymer battery of the present embodiment includes the positive electrode for a lithium ion polymer battery of the present embodiment as the positive electrode, the lithium ion polymer battery has a high energy density and has excellent input and output characteristics.

As generally used, after painting and drying the positive electrode, it is possible to paint the positive electrode with a liquid containing the ion-conductive polymer, dry the painted electrode, and crosslink the ion-conductive polymer as necessary. Then, after bonding the negative electrode, pressure bonding is performed as necessary.

Similarly, the liquid containing the ion-conductive polymer can be painted on the negative electrode to forma film.

For crosslinking, methods generally used such as heat, ultraviolet rays, and electron beam can be suitably used.

EXAMPLES

Hereinafter, the present invention will be more specifically described according to Examples and Comparative Examples, but the present invention is not limited to following Examples.

In present Examples, in order to accurately evaluate the performance of the positive electrode active material, after producing a positive electrode, a battery was produced by laminating a film (thickness 60 μm) using a commercially available ion-conductive polymer and a Li negative electrode and evaluated.

Example 1

Synthesis of Positive Electrode Material for Lithium Ion Polymer Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 150° C. for 24 hours, thereby generating a precipitate of a positive electrode active material.

Next, this precipitate was cleaned with water, thereby obtaining a cake-form positive electrode active material.

Next, 10 g of polyethylene glycol and 8 g of sucrose was added as an organic compound to 150 g (in terms of solid content) of the positive electrode active material, and a dispersion treatment was carried out on a mixture thereof using zirconia balls having a diameter of 5 mm as medium particles in a bead mill for two hours, thereby preparing a homogeneous slurry.

Next, this slurry was sprayed and dried in the atmosphere at 200° C., thereby obtaining agglomerates of a positive electrode material which had an average particle diameter of 8.5 μm and were coated with an organic substance.

Next, the obtained agglomerates were calcinated in a nitrogen atmosphere for three hours at 680° C., thereby obtaining agglomerates of the positive electrode active material which had an average particle diameter of 8.5 mm and were coated with a carbonaceous film.

Cracking of Agglomerates

The above-described agglomerates were cracked using a jet mill device (trade name: SJ-100, manufactured by Nisshin Engineering Inc.) under a condition of a supply rate of 180 g/hour, thereby obtaining a positive electrode material 1 of Example 1.

Production of Lithium Ion Polymer Battery

The positive electrode material 1, polyethylene oxide 100,000 (PEO 100,000, average molecular weight 100,000 g/mol) as an ion-conductive polymer (base material), LiTFSI as a lithium salt, and acetylene black (AB) as a conductive auxiliary agent were mixed into N-methyl-2-pyrrolidinone (NMP) which was a solvent so that the mass ratio (the positive electrode material 1:PEO 100,000:LiTFSI:AB) in paste reached 66:24:6:4 and, furthermore, the total solid content amount of the paste reached 40% by mass, and the components were kneaded using a kneader (trade name: THINKY MIXER, manufactured by Thinky Corporation) for 30 minutes under conditions of a revolution rate of 1,200 rpm and a rotation rate of 800 rpm, thereby preparing positive electrode material paste (for the positive electrode).

This positive electrode material paste (for the positive electrode) was applied onto the surface of a 30 μm-thick aluminum foil (electrode current collector) so as to forma coating film, and the coating film was dried, thereby forming a positive electrode mixture layer on the surface of the aluminum foil.

Thereafter, the positive electrode mixture layer was pressed at a linear pressure of 28,000 N/100 mm to produce a positive electrode 1 of Example 1. This positive electrode was cut into a determined size, and the density was determined from the thickness and mass.

An ion-conductive polymer film as an electrolyte and a lithium metal as a negative electrode were placed on the positive electrode 1 and pressure-bonded at a predetermined pressure, and cut to a size of 2 cm$^2$ to obtain a battery member 1.

Next, the battery member 1 was placed in a CR2032-type coin cell, and the lithium ion polymer battery 1 of Example 1 was produced.

Example 2

A positive electrode material 2 of Example 2 was obtained in the same manner as in Example 1 except for the fact that the agglomerates were cracked at a supply rate of 160 g/hour.

A lithium ion polymer battery 2 of Example 2 was produced in the same manner as in Example 1 except for the fact that the positive electrode material 2 was used.

Example 3

A positive electrode material 3 of Example 3 was obtained in the same manner as in Example 1 except for the fact that the agglomerates were cracked at a supply rate of 150 g/hour.

A lithium ion polymer battery 3 of Example 3 was produced in the same manner as in Example 1 except for the fact that the positive electrode material 3 was used.

Example 4

A positive electrode material 4 of Example 4 was obtained in the same manner as in Example 1 except for the fact that the agglomerates were cracked at a supply rate of 130 g/hour.

A lithium ion polymer battery 4 of Example 4 was produced in the same manner as in Example 1 except for the fact that the positive electrode material 4 was used.

Example 5

A positive electrode material 5 of Example 5 was obtained in the same manner as in Example 1 except for the fact that the agglomerates were cracked at a supply rate of 100 g/hour.

A lithium ion polymer battery 5 of Example 5 was produced in the same manner as in Example 1 except for the fact that the positive electrode material 5 was used.

Example 6

A positive electrode material 6 of Example 6 was obtained in the same manner as in Example 1 except for the fact that the agglomerates were cracked at a supply rate of 90 g/hour.

A lithium ion polymer battery 6 of Example 6 was produced in the same manner as in Example 1 except for the fact that the positive electrode material 6 was used.

Example 7

Synthesis of Positive Electrode Material for Lithium Ion Polymer Battery

Lithium phosphate (Li3PO4) (2 mol) and iron (II) sulfate (FeSO4) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 200° C. for 24 hours, thereby generating a precipitate of a positive electrode active material.

Next, this precipitate was cleaned with water, thereby obtaining a cake-form positive electrode active material.

Next, 10 g of polyethylene glycol and 8 g of sucrose was added as an organic compound to 150 g (in terms of solid content) of the positive electrode active material, and a dispersion treatment was carried out on a mixture thereof using zirconia balls having a diameter of 5 mm as medium particles in a bead mill for two hours, thereby preparing a homogeneous slurry.

Next, this slurry was sprayed and dried in the atmosphere at 200° C., thereby obtaining agglomerates of a positive electrode material which had an average particle diameter of 8.3 μm and were coated with an organic substance.

Next, the obtained agglomerates were calcinated in a nitrogen atmosphere for three hours at 680° C., thereby obtaining agglomerates of the positive electrode active material which had an average particle diameter of 8.3 μm and were coated with a carbonaceous film.

Cracking of Agglomerates

The above-described agglomerates were cracked using a jet mill device (trade name: SJ-100, manufactured by Nisshin Engineering Inc.) under a condition of a supply rate of 100 g/hour, thereby obtaining a positive electrode material 7 of Example 7.

A lithium ion polymer battery 7 of Example 7 was produced in the same manner as in Example 1 except for the fact that the positive electrode material 7 was used.

Example 8

Synthesis of Positive Electrode Material for Lithium Ion Polymer Battery

Lithium phosphate (Li3PO4) (2 mol) and iron (II) sulfate (FeSO4) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 160° C. for 16 hours, thereby generating a precipitate of a positive electrode active material.

Next, this precipitate was cleaned with water, thereby obtaining a cake-form positive electrode active material.

Next, 10 g of polyethylene glycol and 8 g of sucrose was added as an organic compound to 150 g (in terms of solid content) of the positive electrode active material, and a dispersion treatment was carried out on a mixture thereof using zirconia balls having a diameter of 5 mm as medium particles in a bead mill for two hours, thereby preparing a homogeneous slurry.

Next, this slurry was sprayed and dried in the atmosphere at 200° C., thereby obtaining agglomerates of a positive electrode material which had an average particle diameter of 8.9 μm and were coated with an organic substance.

Next, the obtained agglomerates were calcinated in a nitrogen atmosphere for three hours at 680° C., thereby obtaining agglomerates of the positive electrode active material which had an average particle diameter of 8.9 μm and were coated with a carbonaceous film.

Cracking of Agglomerates

The above-described agglomerates were cracked using a jet mill device (manufactured by Nisshin Engineering Inc., trade name: SJ-100) under a condition of a supply rate of 90 g/hour, thereby obtaining a positive electrode material 8 of Example 8.

A lithium ion polymer battery 8 of Example 8 was produced in the same manner as in Example 1 except for the fact that the positive electrode material 8 was used.

Example 9

Synthesis of Positive Electrode Material for Lithium Ion Polymer Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 120° C. for 48 hours, thereby generating a precipitate of a positive electrode active material.

Next, this precipitate was cleaned with water, thereby obtaining a cake-form positive electrode active material.

Next, 10 g of polyethylene glycol and 8 g of sucrose was added as an organic compound to 150 g (in terms of solid content) of the positive electrode active material, and a dispersion treatment was carried out on a mixture thereof using zirconia balls having a diameter of 5 mm as medium particles in a bead mill for two hours, thereby preparing a homogeneous slurry.

Next, this slurry was sprayed and dried in the atmosphere at 200° C., thereby obtaining agglomerates of a positive electrode material which had an average particle diameter of 9.1 μm and were coated with an organic substance.

Next, the obtained agglomerates were calcinated in a nitrogen atmosphere for three hours at 680° C., thereby obtaining agglomerates of the positive electrode active material which had an average particle diameter of 9.1 μm and were coated with a carbonaceous film.

Cracking of Agglomerates

The above-described agglomerates were cracked using a jet mill device (manufactured by Nisshin Engineering Inc., trade name: SJ-100) under a condition of a supply rate of 80 g/hour, thereby obtaining a positive electrode material 9 of Example 9.

A lithium ion polymer battery 9 of Example 9 was produced in the same manner as in Example 1 except for the fact that the positive electrode material 9 was used.

Comparative Example 1

A positive electrode material 10 of Comparative Example 1 was obtained in the same manner as in Example 1 except for the fact that the agglomerates were cracked at a supply rate of 280 g/hour.

A lithium ion polymer battery 10 of Comparative Example 1 was produced in the same manner as in Example 1 except for the fact that the positive electrode material 10 was used.

Comparative Example 2

A positive electrode material 11 of Comparative Example 2 was obtained in the same manner as in Example 1 except for the fact that the agglomerates were cracked at a supply rate of 250 g/hour.

A lithium ion polymer battery 11 of Comparative Example 2 was produced in the same manner as in Example 1 except for the fact that the positive electrode material 11 was used.

Comparative Example 3

A positive electrode material 12 of Comparative Example 3 was obtained in the same manner as in Example 1 except for the fact that the agglomerates were not cracked.

A lithium ion polymer battery 12 of Comparative Example 3 was produced in the same manner as in Example 1 except for the fact that the positive electrode material 12 was used.

Comparative Example 4

A positive electrode material 13 of Comparative Example 4 was obtained in the same manner as in Example 7 except for the fact that the agglomerates were not cracked.

A lithium ion polymer battery 13 of Comparative Example 4 was produced in the same manner as in Example 1 except for the fact that the positive electrode material 13 was used.

Comparative Example 5

A positive electrode material 14 of Comparative Example 5 was obtained in the same manner as in Example 8 except for the fact that the agglomerates were cracked at a supply rate of 65 g/hour.

A lithium ion polymer battery 14 of Comparative Example 5 was produced in the same manner as in Example 1 except for the fact that the positive electrode material 14 was used.

Comparative Example 6

A positive electrode material 15 of Comparative Example 6 was obtained in the same manner as in Example 9 except for the fact that the agglomerates were cracked at a supply rate of 55 g/hour.

A lithium ion polymer battery 15 of Comparative Example 6 was produced in the same manner as in Example 1 except for the fact that the positive electrode material 15 was used.

Evaluation of Positive Electrode Material for Lithium Ion Polymer Battery

The positive electrode materials fora lithium ion polymer battery and the lithium ion polymer batteries of Example 1 to Example 9 and Comparative Example 1 to Comparative Example 6 were evaluated as described below.

(1) BET Specific Surface Area

The BET specific surface area of the positive electrode material for a lithium ion polymer battery was measured using a measurement device (trade name: HM model-1208, manufactured by Mountech Co., Ltd.) and a one-point method at a relative pressure of 0.29 ($P/P_0$).

(2) Amount of Carbon

The amount of carbon in the positive electrode material for a lithium ion polymer battery was measured using a carbon/sulfur analyzer (trade name: EMIA-220V, manufactured by Horiba Ltd.).

(3) Powder Resistance Value

The powder resistance value of the positive electrode material for a lithium ion polymer battery was measured using a specimen produced by injecting the positive electrode material into a die and shaping the positive electrode material at a pressure of 50 MPa, a low resistivity meter (trade name: Loresta-GP, manufactured by Mitsubishi Chemical Corporation), and a four point measurement at 25° C.

(4) Median Diameter

The median diameter of the positive electrode material for a lithium ion polymer battery was measured using the following method.

The median diameter was measured using a measurement device (trade name: LA-950V2, manufactured by Horiba Ltd.).

First, pure water (40 g) and polyvinyl pyrrolidone (PVP) (0.12 g) as a dispersion liquid and the positive electrode material for a lithium ion polymer battery (0.04 g) as specimen powder were weighed in a 70 mL mayonnaise bottle. This mayonnaise bottle was manually shaken approximately ten times so as to mix the specimen powder and the dispersion liquids well.

Next, the mixed solution of the specimen powder and the dispersion liquids was treated with ultrasonic waves for two minutes under conditions of an output of 5 and a pulse of 50% in an ultrasonic homogenizer (trade name: SONIFIER450, manufactured by Branson Ultrasonics, Emersion Japan, Ltd.), and the median diameter was measured using the obtained dispersion solution. The median diameter refers to the particle diameter at a point at which the distribution curve of the integral percentage in the particle size distribution intersects the horizontal axis of 50% and thus was calculated on the basis of the measurement result of the particle size distribution of the positive electrode material for a lithium ion polymer battery.

The median diameter was measured with the data loading number set to 5,000 for a semiconductor laser (LD) and 1,000 for a light-emitting diode (LED), and the data computation conditions were as described below.

<Computation Conditions>
(Sample Refractive Index)
LD real part: 1.48
LD imaginary part: 0.45
LED real part: 1.50
LED imaginary part: 0.55
(Dispersion medium refractive index)
LD real part: 1.33
LD imaginary part: 0.00
LED real part: 1.33
LED imaginary part: 0.00
(Number of repetitions): 15 times
(Particle diameter reference): volume
(Calculation algorithm): standard computation (5) Coarse Particle Ratio The coarse particle ratio was calculated from Expression (1) using the coarse particle-side peak area A and the fine particle-side peak area B in the particle size distribution of the positive electrode material for a lithium ion polymer battery which had been obtained in the measurement of the median diameter.

$$\text{Coarse particle ratio}(\%) = A/(A+B) \times 100 \quad (1)$$

(6) Chromaticity $b^*$

The chromaticity $b^*$ in the $L^*a^*b^*$ color system of the positive electrode material for a lithium ion polymer battery was measured by means of reflected light two-degree viewing angle measurement in which a spectrophotometer (Model No.: SE-2000, manufactured by Nippon Denshoku Industries Co., Ltd.) and a D65 light source were used. In a case where the chromaticity $b^*$ of the positive electrode material for a lithium ion polymer battery was measured, the positive electrode material which was the measurement subject was evenly placed on a schale, and the chromaticity $b^*$ of the positive electrode material was measured.

Evaluation of paste for lithium ion polymer battery and positive electrode for lithium ion polymer battery (7) Paste Viscosity Regarding the viscosity of paste for a lithium ion polymer battery, for the positive electrode material paste produced using the above-described method, a dynamic viscoelasticity measurement instrument (Model No.: RS-6000, manufactured by Thermo Fisher Scientific Inc.) was used, the measurement temperature was 25° C., a C20/4-TiL10 sensor was used, the gap between the sensor and a plate was 0.14 mm, the shear rate was increased in a range from 0.01 [1/s] to 20 [1/s] in each 15-second process, and the viscosity at a shear rate of 4.0 [1/s] was scanned.

(8) Positive Electrode Density

The positive electrode density of the positive electrode for a lithium ion polymer battery was calculated as the ratio of the mass of the positive electrode material as the numerator to the volume of the positive electrode which was the compressed positive electrode excluding the aluminum electrode current collector as the denominator.

In addition, the porosity of the positive electrode was estimated by the following expression from the theoretical density (2.3 $g/cm^3$) of the positive electrode expected from the theoretical density of each member.

$$\text{Porosity} = (1 - \text{positive electrode density}/\text{positive electrode theoretical density}) \times 100 [\%]$$

Evaluation of lithium ion polymer battery (9) Initial Discharge Capacity

The initial discharge capacity of the lithium ion polymer battery was evaluated as follows. The lithium ion polymer battery was charged at a constant current in a 60° C. environment until the battery voltage reached 4.2 V at a current value of 0.1 C and then charged at a constant voltage of 4.2 V until the current decreased to an equivalent of 0.01 C. Thereafter, the time when the batter was discharged until the battery voltage reached 2.0 V at a current value of 0.1 C was defined as one cycle, and the capacity at the second cycle was defined as the initial discharge capacity. In a case where the agglomerates are not sufficiently cracked, since the ion-conductive polymer does not penetrate into the agglomerates, the ion-conductive polymer does not sufficiently come into contact with the surface of the active material, the supply of lithium ions becomes insufficient, and the capacity decreases. Moreover, since the pores remain, the electrode density decreases, that is, the porosity increases.

(10) Capacity Retention Rate after 20 Cycles

Regarding the capacity retention rate of the lithium ion polymer battery after 20 cycles, the charge and discharge were repeated 20 cycles under conditions described above, and the ratio when the discharge capacity at the second cycle was used as the denominator and the discharge capacity at the 20th cycle was used as the numerator was evaluated as the capacity retention rate. In a case where the electron conductivity of the positive electrode material was not sufficiently guaranteed, the active material particles repeatedly expanded and shrank according to the charge and discharge cycles, and thus the number of electron conduction paths in the positive electrode became insufficient and the capacity retention rate decreases.

Evaluation Results

The evaluation results of the positive electrode materials for a lithium ion polymer battery and the lithium ion polymer batteries of Examples 1 to 9 and the evaluation results of the positive electrode materials for a lithium ion polymer battery and the lithium ion polymer batteries of Comparative Examples 1 to 6 are shown in Table 1. Meanwhile, the amount of carbon in Table 1 is the amount (parts by mass) of carbon forming the carbonaceous film with respect to 100 parts by mass of the positive electrode active material.

In a case where Example 1 to Example 9 and Comparative Example 1 to Comparative Example 6 were compared on the basis of the results of Table 1, in Comparative Example 1 to Comparative Example 6 in which the viscosity exceeded 5,000 mPa·s when the shear rate of the paste having a total solid content amount of 40% by mass was 4.0 [1/s], neither the electron conductivity nor the positive electrode density was sufficient. In contrast, in Example 1 to Example 9 in which the viscosity was 5,000 mPa·s or less when the shear rate of the paste having a total solid content amount of 40% by mass was 4.0 [1/s], it was confirmed that it was possible to improve the positive electrode density while guaranteeing the electron conductivity.

INDUSTRIAL APPLICABILITY

Lithium ion polymer batteries for which the positive electrode material for a lithium ion polymer battery of the present invention is used have an excellent energy density, input and output characteristics, and durability and are thus

TABLE 1

| | Supply rate of the agglomerates [g/h] | Viscosity of paste [mPa·s] | Coarse particle ratio [%] | Specific surface area [$m^2$/g] | Amount of carbon [%] | Powder resistance value [$\Omega \cdot cm$] | Chromaticity b* |
|---|---|---|---|---|---|---|---|
| Example 1 | 180 | 3,300 | 62 | 8.6 | 1.06 | 26 | 1.87 |
| Example 2 | 160 | 3,010 | 59 | 8.6 | 1.06 | 30 | 1.9 |
| Example 3 | 150 | 3,000 | 55 | 8.8 | 1.06 | 39 | 1.95 |
| Example 4 | 130 | 2,920 | 46 | 8.7 | 1.06 | 47 | 2.07 |
| Example 5 | 100 | 2,800 | 44 | 8.8 | 1.06 | 59 | 2.18 |
| Example 6 | 90 | 2,770 | 42 | 8.8 | 1.06 | 61 | 2.20 |
| Example 7 | 100 | 2,610 | 53 | 5.9 | 0.79 | 50 | 2.19 |
| Example 8 | 90 | 3,420 | 48 | 15.1 | 1.94 | 79 | 2.23 |
| Example 9 | 80 | 4,820 | 45 | 24.1 | 2.88 | 94 | 2.27 |
| Comparative Example 1 | 280 | 6,820 | 77 | 8.4 | 1.06 | 11 | 1.8 |
| Comparative Example 2 | 250 | 5,940 | 70 | 8.4 | 1.06 | 14 | 1.87 |
| Comparative Example 3 | — | 6,840 | 100 | 8.3 | 1.06 | 9 | 1.75 |
| Comparative Example 4 | — | 6,520 | 100 | 5.7 | 0.79 | 7 | 1.7 |
| Comparative Example 5 | 65 | 5,310 | 32 | 15.9 | 1.94 | 365 | 2.57 |
| Comparative Example 6 | 55 | 6,450 | 30 | 24.7 | 2.88 | 581 | 2.39 |

| | Median diameter [μm] | Positive electrode density [g/$cm^3$] | Positive electrode porosity [%] | Discharge capacity at second cycle [mAh/g] | Discharge capacity at 20th cycle [mAh/g] | Capacity retention rate at 20th cycle [%] |
|---|---|---|---|---|---|---|
| Example 1 | 0.78 | 2.22 | 3.5 | 154 | 154 | 100.0 |
| Example 2 | 0.74 | 2.23 | 3.0 | 155 | 155 | 100.0 |
| Example 3 | 0.71 | 2.23 | 3.0 | 155 | 154 | 99.4 |
| Example 4 | 0.66 | 2.24 | 2.6 | 156 | 154 | 98.7 |
| Example 5 | 0.64 | 2.26 | 1.7 | 157 | 153 | 97.5 |
| Example 6 | 0.6 | 2.28 | 0.9 | 158 | 152 | 96.2 |
| Example 7 | 0.53 | 2.30 | 0.0 | 159 | 154 | 96.9 |
| Example 8 | 0.63 | 2.29 | 0.4 | 154 | 150 | 97.4 |
| Example 9 | 0.72 | 2.20 | 4.3 | 151 | 149 | 98.7 |
| Comparative Example 1 | 0.85 | 2.10 | 8.7 | 149 | 140 | 94.0 |
| Comparative Example 2 | 0.84 | 2.14 | 7.0 | 149 | 141 | 94.6 |
| Comparative Example 3 | 8.5 | 2.00 | 13.0 | 125 | 122 | 97.6 |
| Comparative Example 4 | 8.3 | 2.03 | 11.7 | 131 | 129 | 98.5 |
| Comparative Example 5 | 0.61 | 2.08 | 9.6 | 152 | 124 | 81.6 |
| Comparative Example 6 | 0.63 | 2.06 | 10.4 | 150 | 120 | 80.0 | capable of significantly contributing to the advancement of the reliability of lithium ion polymer batteries including mobile body uses.

The present invention can provide a positive electrode material for a lithium ion polymer battery which suppresses the peeling of a carbonaceous film that coats the surfaces of primary particles of a positive electrode active material and is capable of improving the positive electrode density while guaranteeing the electron conductivity, a positive electrode for a lithium ion polymer battery including the positive electrode material for a lithium ion polymer battery, and a lithium ion polymer battery including the positive electrode for a lithium ion polymer battery.

The invention claimed is:

1. A positive electrode material for a lithium ion polymer battery, wherein the positive electrode material consists of active material particles which includes core particles represented by General Formula $Li_xA_yD_zPO_4$ (here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$) and a carbonaceous film that coats surfaces of the core particles,
wherein a paste including the active material particles has a viscosity of 5,000 mPa·s or less, when a viscosity of the paste is measured at a shear rate of 4.0 [1/s],
wherein the paste is a mixture of the active material particles, an ion-conductive polymer, a conductive auxiliary agent and a solvent, in which the active material particles, the ion-conductive polymer and the conductive auxiliary agent are included in the paste in a mass ratio of 66:30:4, and a total solid content of the paste is 40% by mass.

2. The positive electrode material for a lithium ion polymer battery according to claim 1, wherein a powder resistivity of the active material particles is 100 Ω·cm or less.

3. The positive electrode material for a lithium ion polymer battery according to claim 1, wherein a BET specific surface area of the active material particles is 5 m²/g or more and 25 m²/g or less.

4. The positive electrode material for a lithium ion polymer battery according to claim 1, wherein an amount of carbon forming the carbonaceous film is 0.1 parts by mass or more and 10 parts by mass or less with respect to 100 parts by mass of the core particles.

5. The positive electrode material for a lithium ion polymer battery according to claim 1, wherein a coarse particle ratio in a particle size distribution of the active material particles is 35% or more and 65% or less.

6. The positive electrode material for a lithium ion polymer battery according to claim 1, wherein a median diameter of the active material particles is 0.50 μm or more and 0.80 μm or less, and chromaticity b* in an L*a*b* color system is 1.9 or more and 2.3 or less.

7. The positive electrode material for a lithium ion polymer battery according to claim 1, wherein the particle size distribution of the active material has at least two peaks, a maximum value of a fine particle-side peak in the particle size distribution of the active material particles is in a range of 0.15 μm or more and 0.35 μm or less, and a maximum value of a coarse particle-side peak in the particle size distribution of the active material particles is in a range of 0.80 μm or more and 1.20 μm or less.

8. A positive electrode for a lithium ion polymer battery, comprising:
an electrode current collector; and
a positive electrode mixture layer formed on the electrode current collector,
wherein the positive electrode mixture layer includes the positive electrode material for a lithium ion polymer battery according to claim 1.

9. A lithium ion polymer battery comprising:
the positive electrode for a lithium ion polymer battery according to claim 8.

10. The positive electrode material for a lithium ion polymer battery according to claim 1, wherein
the ion-conductive polymer comprises at least one selected form polyethylene oxide and a modified polyethylene oxide,
the conductive auxiliary agent comprises at least one selected from the group consisting of acetylene black, KETJEN BLACK, furnace black, fibrous carbon and carbon nanotube, and
the solvent comprises at least one selected from the group consisting of water, alcohols, esters, ethers, ketones, amides, and glycols.

11. The positive electrode material for a lithium ion polymer battery according to claim 1, wherein the ion-conductive polymer comprises at least one of lithium salts.

12. The positive electrode material for a lithium ion polymer battery according to claim 1, wherein the solvent is N-methyl-2-pyrrolidone.

13. The positive electrode material for a lithium ion polymer battery according to claim 1, wherein the paste is used to evaluate the active material particles.

* * * * *